US00RE42703E

(19) United States
(12) Reissued Patent
Chen et al.

(10) Patent Number: US RE42,703 E
(45) Date of Reissued Patent: Sep. 13, 2011

(54) SYSTEM AND METHOD FOR FIBRECHANNEL FAIL-OVER THROUGH PORT SPOOFING

(75) Inventors: Sheng-Wei Chen, Hauppauge, NY (US); Stephen Anthony McNulty, Smithtown, NY (US)

(73) Assignee: FalconStor, Inc., Melville, NY (US)

(21) Appl. No.: 11/394,326

(22) Filed: Mar. 30, 2006
(Under 37 CFR 1.47)

Related U.S. Patent Documents

Reissue of:
(64) Patent No.: 6,715,098
Issued: Mar. 30, 2004
Appl. No.: 10/047,919
Filed: Oct. 23, 2001

U.S. Applications:
(63) Continuation-in-part of application No. 09/925,976, filed on Aug. 9, 2001, now Pat. No. 7,093,127, and a continuation-in-part of application No. 09/792,873, filed on Feb. 23, 2001, now abandoned.

(51) Int. Cl.
*G06F 11/00* (2006.01)
(52) U.S. Cl. ..... 714/3; 714/5
(58) Field of Classification Search ..... 714/3, 5, 714/6, 13, 48
See application file for complete search history.

(56) References Cited

U.S. PATENT DOCUMENTS

| | | | |
|---|---|---|---|
| 5,136,498 | A | 8/1992 | McLaughlin et al. |
| 5,151,987 | A | 9/1992 | Abraham et al. |
| 5,202,822 | A | 4/1993 | McLaughlin et al. |
| 5,206,946 | A | 4/1993 | Brunk |
| 5,237,695 | A | 8/1993 | Skokan et al. |
| 5,274,783 | A | 12/1993 | House et al. |
| 5,287,537 | A | 2/1994 | Newmark et al. |
| 5,325,527 | A | 6/1994 | Cwikowski et al. |
| 5,333,277 | A | 7/1994 | Searls |
| 5,388,243 | A | 2/1995 | Glider et al. |
| 5,463,772 | A | 10/1995 | Thompson et al. |
| 5,471,634 | A | 11/1995 | Giorgio et al. |
| 5,491,812 | A | 2/1996 | Pisello et al. |

(Continued)

OTHER PUBLICATIONS

"SCSI—adapter for hard disks. Part 3,: BIOS," Klien, R.-D, Thiel, T., Mikrocomputer Zeitschrift, No. 12, pp. 88-98, 102-5, publ. Dec. 1989.

(Continued)

*Primary Examiner* — Bryce P Bonzo
(74) *Attorney, Agent, or Firm* — Brandon N. Sklar, Esq.; Kaye Scholer LLP

(57) ABSTRACT

In a system for appliance back-up, a primary appliance is coupled to a network, whereby the primary appliance receives requests or commands and sends a status message over the network to a standby appliance, which indicates that the primary appliance is operational. If the standby appliance does not receive the status message or the status message is invalid, the standby appliance writes a shutdown message to a storage device. The primary appliance then reads the shutdown message stored in the storage device and disables itself from processing requests or commands. When the primary appliance completes these tasks, it disables communication connections and writes a shutdown completion message to the storage device. The standby appliance reads the shutdown completion message from the storage device and initiates a start-up procedure. This procedure causes the address of the standby appliance to be identical to the primary appliance address, and the standby appliance processes the requests or commands in place of the primary appliance.

77 Claims, 7 Drawing Sheets

U.S. PATENT DOCUMENTS

| | | | | |
|---|---|---|---|---|
| 5,504,757 | A | 4/1996 | Cook et al. | |
| 5,524,175 | A | 6/1996 | Sato et al. | |
| 5,528,765 | A | 6/1996 | Milligan | |
| 5,548,731 | A | 8/1996 | Chang et al. | |
| 5,548,783 | A | 8/1996 | Jones et al. | |
| 5,561,812 | A | 10/1996 | Ravaux et al. | |
| 5,566,331 | A | 10/1996 | Irwin, Jr. et al. | |
| 5,574,861 | A | 11/1996 | Lorvig et al. | |
| 5,574,862 | A | 11/1996 | Marianetti | |
| 5,596,723 | A | 1/1997 | Romohr | |
| 5,613,160 | A | 3/1997 | Kraslavsky et al. | |
| 5,640,541 | A | 6/1997 | Bartram et al. | |
| 5,664,221 | A | 9/1997 | Amberg et al. | |
| 5,787,019 | A | 7/1998 | Knight et al. | |
| 5,812,751 | A | 9/1998 | Ekrot et al. | |
| 5,819,054 | A | 10/1998 | Ninomiya et al. | |
| 5,892,955 | A | 4/1999 | Ofer | |
| 5,923,850 | A | 7/1999 | Barroux | |
| 5,925,119 | A | 7/1999 | Maroney | |
| 5,941,972 | A | 8/1999 | Hoese et al. | |
| 5,991,813 | A | 11/1999 | Zarrow | |
| 5,996,024 | A | 11/1999 | Blumenau | |
| 6,003,065 | A | 12/1999 | Yan et al. | |
| 6,041,381 | A | 3/2000 | Hoese | |
| 6,108,300 | A * | 8/2000 | Coile et al. | 370/217 |
| 6,178,173 | B1 | 1/2001 | Mundwiler et al. | |
| 6,188,997 | B1 | 2/2001 | Ratzenberger, Jr. et al. | |
| 6,263,445 | B1 | 7/2001 | Blumenau | |
| 6,363,497 | B1 | 3/2002 | Chrabaszcz | |
| 6,449,733 | B1 | 9/2002 | Bartlett et al. | |
| 6,496,942 | B1 | 12/2002 | Schoenthal et al. | |
| 6,523,131 | B1 | 2/2003 | Findlay et al. | |
| 6,574,753 | B1 | 6/2003 | Haynes et al. | |
| 6,658,004 | B1 | 12/2003 | Kadansky et al. | |
| 6,735,200 | B1 | 5/2004 | Novaes | |
| 7,000,121 | B2 | 2/2006 | Jarosz | |
| 2001/0056554 | A1 * | 12/2001 | Chrabaszcz | 714/13 |
| 2002/0129159 | A1 | 9/2002 | Luby et al. | |

OTHER PUBLICATIONS

"General host interface for SCSI applications," Putnam, T., Opticalinfo 89. The International Meeting for Optical Publishing and Storage, pp. 99-105, publ. Learned Information, Oxford, UK, 1989.
"Automatic Small Computer System Interface Termination Circuit for Narrow/Wide Devices on Wide Bus," IBM Technical Disclosure Bulletin, pp. 79-82, Apr. 1997.
"Transparent Target Mode for a Small Computer System Interface," IBM Technical Disclosure Bulletin, pp. 161-164, Aug. 1990.
"Automatic Target Mode for the Small Computer System Interface" IBM Technical Disclosure Bulletin, pp. 130-133, Oct. 1990.
"Method Allowing Small Computer Interface Adapters to Coexist with Other Hardfile Adapters," IBM Technical Disclosure Bulletin, pp. 709-710, Sep. 1994.
"Software Solution for Coordinating a Small Computer System Interface with Multiple Drives," IBM Technical Disclosure Bulletin, pp. 577-578, Jun. 1995.
"Multi-Thread Sequencing in a Small Computer Interface Environment," IBM Technical Disclosure Bulletin, pp. 497-500, Sep. 1994.
SCSI Device Auto-Sensing for On-Board SCSI Interface Sub-System, IBM Technical Disclosure, pp. 395-396, Feb. 1994.
"Small Computer System Interface ID Translation," IBM Technical Disclosure Bulletin, pp. 125-126, Feb. 1994.
"Single-Ended Device to Differential Small Computer System Interface Converter," IBM Technical Disclosure Bulletin, pp. 457-458, Dec. 1993.
SCSI Multiple Initiator, IBM Disclosure Bulletin, pp. 367-369, Sep. 1992.
"Self Configuring Small Computer System Interface Device Driver," IBM Technicial Disclosure Bulletin, pp. 135-142, Mar. 1995.
"Multiple Small Computer System Interface Command Arrangement," IBM Technical Disclosure Bulletin, pp. 613-614, Jan. 1995.
"Real-Time Performance for Small Computer System Interface Disk Arrays," IBM Technical Bulletin, pp. 33-34, Feb. 1996.
"Managing Queue Full Status for Small Computer System Interface, Version 2," IBM Technical Disclosure Bulletin, pp. 247-248, Jul. 1995.
"Small Computer Systems Interface Identification Qualification During Selection/Deselection," IBM Technical Disclosure Bulletin, pp. 209-210, Dec. 1990.
"Suppress Illegal Length Indication on the Small Computer System Interface While Still Detecting Length Errors," IBM Technical Disclosure Bulletin, pp. 316-318, Mar. 1990.
"SCSI-3 Generic Packetized Protocol (SCSI-GPP)," Information Processing Systems Technical Report, (Rev 9, Jan. 12, 1995) publ. 1997 by American National Standards Institute.
"XDR: External Data Representation Standard," Network Working Group, RFC 1014, Sun Microsystems, Inc., Jun. 1987 (http://rfc.net/rfc1014.html).
"Information Technology-SCSI Architecture Model-2 (SAM-2)," T10 Technical Committee, NCITS, Project 1157—D, Revision 14 (Working Draft), Sep. 17, 2000, Distributed by Global Engineering Documents, Englewood, CO.
"Network-attached peripherals (NAP) for HPSS/SIOF," Lawrence Livermore National Laboratory, Oct. 1995 (www.llnl.gov/liv_comp/siof_nap.html).
"A Brief Survey of Current Work on Network Attached Periphals," (Extended Abstract) Van Meter, Rodney pp. 63-70, Operating Systems Review, Jan. 1996, ACM Press.
"A Brief Survey of Current Work on Network Attached Peripherals," Van Meter, Rodney D., Information Sciences Institute, University of Southern California, Jan. 19, 1996.
"A Case for Network-Attached Secure Disks," Gibson, Garth A., David F. Nagle, Khalil Amiri, Fay W. Chang, Eugene Feinberg, Howard Gobioff, Chen Lee, Berend Ozceri, Erik Riedel and David Rochberg, School of Computer Science, Carnegie Mellon University, Sep. 1996 .
"Solving Network Storage Problems," Network Storage Solutions, Inc., 600 Hemdon Parkway, Hemdon, VA 22070, (www.networkbuyersguide.com/search/129002.htm) (no date).
"Betting on Networked Raid—Who is competing for a piece of the raid market? Carmen Marchionni of OSSI reveals an insider's viewpoint to the market," (www.ossi.net/about/abet.html), Jun. 1996.
"NVD Research Issues and Preliminary Models," Finn, Gregory G., Steven Hotz, and Van Meter, Rod, USC/Information Sciences Institute, Mar. 1995 (updated Sep. 1, 1995) (www.isi.edu/div7/netstation).
"Visa: Netstation's Virtual Internet SCSI Adapter," Van Meter, Rodney, USC/Information Sciences Institute, Jul. 15, 1997 (slides).
"Visa: Netstation's Virtual Internet SCSI Adapter," Van Meter, Rodney, Gregory G. Finn, and Steve Hotz, Information Sciences Institute, University of Southern California, Asplos 8, Oct. 1998.
"Task Force on Network Storage Architecture: Internet-attached storage devices," Van Meter, Rodney, Steve Hotz and Gregory G. Finn, University of Southern California/Information Sciences Institute, IEEE, p. 726, publ. in the Proceedings of the Hawaii Intl. Conf. on System Sciences, Jan.
"Atomic: A Low-Cost, Very High-Speed, Local Communication Architecture," Cohen, Danny, Gregory Finn, Robert Felderman, Annette DeSchon, USC/Information Sciences Institute, 1993 International Conference on Parallel Processing.
"Atomic: A High-Speed Local Communication Architecture," Felderman, Robert, Annette DeSchon, Danny Cohen, Gregory Finn, USC/Information Sciences Institute, Journal of High Speed Networks 1 (1994), pp. 1-28, IOS Press.
"Atomic: A Local Communication Network Created Through Repeated Application of Multicomputing Components," Cohen, Danny, Gregory Finn, Robert Felderman, Annette DeSchon, University of Southern California/Information Sciences Institute, Oct. 1992.
"An Integration of Network Communication with Workstation Architecture," Finn, Gregory G. USC/Information Sciences Institute, Oct. 1991, ACM Computer Communication Review.
"Atomic: A Low-Cost, Very-High-Speed LAN," Cohen, Danny, Gregory Finn, Robert Felderman, Annette DeSchon, USC/Information Sciences Institute (no date of publ.) (probably before 1995).

"Interfacing High-Definition Displays via the Internet," Finn, Gregory G., Rod Van Meter, Steve Hotz, Bruce Parham, USC/Information Sciences Institute, Aug. 1995.
"Netstation Architecture Multi-Gigabit Workstation Network Fabric," Finn, Gregory G., Paul Mockapetris, USC/Information Sciences Institute (no date)(probably before 1995).
"Netstation Architecture Gigabit Communication Fabric," Finn, G. G., USC/Information Sciences Institute, University of Southern California, Apr. 1994, (slidechart/diagrams).
"The Use of Message-Based Multicomputer Components to Construct Gigabit Networks," Cohen, Danny, Gregory G. Finn, Robert Felderman and Annette DeSchon, USC/Information Sciences Institute, Jun. 1992.
"Transoft polishes SCSI-Net hub; Stalker Ships SCSI-Sharing Tool," by Nathalie Welch, MacWeek, Aug. 22, 1994 (News section).
"SCSIShare/Share that Scanner," p. 71, Nov. 1995, MacUser.
"Stalker Software Announces an Update and a Free Demo of Their Popular SCSIShare Software," by Larry Allen, Mac Mania News, Jul. 30, 1998.
"IP Storage (ips)," IETF, (updated as of Oct. 2000)(www.ietf.org/html.charters/ips-charter.html).
"Encapsulating IP with the Small Computer System Interface," Elliston, B., Compucat Research, Network Working Group, RFC 2143, May 1997 (http://rfc.net/rfc2143.html).
"Encapsulating IP Using SCSI," Elliston, Ben, Linux Journal, Aug. 1998 (www2.linuxjournal.com/lj-issues/issue52/2344.html).
"IP Encapsulation in SCSI Driver," Scott, Randy, Chris Frantz and Alan Bork, Feb. 1997 (www.msoe.edu/~sebern/courses/cs400/team1/final/index.htm).
"Networking CD-ROMs—The Power of Shared Access," Perratore, Ed, PC Magazine, Dec. 31, 1991, pp. 333-363.
EDS and ASI Wireless Team to Provide Industry-First Complete and Secure A-Key Programming solution, Business Wire, Mar. 31, 1998.
"Transoft polishes SCSI-Net hub; Stalker Ships SCSI-Sharing Tool," by Nathalie Welch, MacWeek, Aug. 22, 1994 (News section).
"SCSIShare/Share that Scanner," p. 71, Nov. 1995, MacUser.
"Stalker Software Announces an Update and a Free Demo of Their Popular SCSIShare Software," by Larry Allen, Mac Mania News, Jul. 30, 1998.
"IP Storage (ips)," IETF, (updated as of Oct. 2000) (www.ietf.org/html.charters/ips-charter.html).
"Encapsulating IP with the Small Computer System Interface," Elliston, B., Compucat Research, Network Working Group, RFC 2143, May 1997 (http://rfc.net/rfc2143.html).
"Encapsulatinp IP Using SCSI," Elliston, Ben, Linux Journal, Aug. 1998 (www2.1inuxjournal.com/lj-issues/issue52/2344.html).
"IP Encapsulation in SCSI Driver," Scott, Randy, Chris Frantz and Alan Bork, Feb. 1997 (www.msoe.edu/~sebern/courses/cs400/team1/final/index.htm).
"Networking CD-ROMs—The Power of Shared Access," Perratore, Ed, PC Magazine, Dec. 31, 1991, pp. 333-363.
EDS and ASI Wireless Team to Provide Industry-First Complete and Secure A-Key Programming solution, Business Wire, Mar. 31, 1998.
Song, Huang, Kappler, Feimark and Kozlik "Fault-Tolerant Ethernet Middleware for IP-Based Process Control Networks" IEEE 2000.*
"Task Force on Network Storage Architecture: Internet-attached storage devices," Van Meter, Rodney, Steve Hotz and Gregory G. Finn, University of Southern California/Information Sciences I IEEE, p. 726, publ. in the Proceedings of the Hawaii Intl. Conf. on System Sciences, Jan. 8-10, 1997 Wailea, HI.

* cited by examiner

SYSTEM AND METHOD FOR FIBRECHANNEL FAIL-OVER THROUGH PORT SPOOFING

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of U.S. patent application Ser. No. 09/792,873, filed Feb. 23, 2001 *now abandoned*, entitled "Storage Area Network Using A Data Communication Protocol," and is also a continuation-in-part of U.S. patent application Ser. No. 09/925,976, filed Aug. 9, 2001 *now U.S. Pat. No. 7,093,127*, entitled "System And Method For Computer Storage Security," the disclosures of which are incorporated herein by reference.

BACKGROUND OF THE INVENTION

The present invention concerns "port spoofing," which allows a computer to "fail over" to its secondary fibrechannel connection if its primary fibrechannel connection should fail.

Fibrechannel is a network and channel communication technology that supports high-speed transmission of data between two points and is capable of supporting many different protocols such as SCSI (Small Computer Systems Interface) and IP (Internet Protocol). Computers, storage devices and other devices must contain a fibrechannel controller or host adapter in order to communicate via fibrechannel. Unlike standard SCSI cables, which can not extend more than 25 meters, fibrechannel cables can extend up to 10 km. The extreme cable lengths allow devices to be placed far apart from each other, making it ideal for use in disaster recovery planning. Many companies use the technology to connect their mass storage and backup devices to their servers and workstations.

In addition to being able to protect data through disaster recovery plans and backup, another requirement for a computer data communications network is that the storage devices must always be available for data storage and retrieval. This requirement is called "High Availability." High Availability is a computer system configuration implemented with hardware and software such that, if a device fails, another device or system that can duplicate the functionality of the failed device will come on-line to take its place automatically and transparently. Users will not be aware that a failure and switch-over had taken place if the system is implemented properly. Many companies cannot afford to have downtime on their computer systems for any length of time. High availability is used to ensure that their computer systems remain running continuously in the event of any device failure. Servers, storage devices, network switches and network connections are redundant and cross-connected to achieve High Availability. FIG. 1 shows a typical prior art fibrechannel High Availability configuration.

In the configuration of FIG. 1, High Availability is achieved by first creating mirrored storage devices 145 and 150 and then establishing multiple paths to the storage devices which are represented by the fibrechannel connections 105, 110, 125, 130, 135, and 140. This configuration allows the server 100 to continuously be able to store and retrieve its data, even if multiple failures have occurred, as long as one of its redundant hardware components or fibrechannel connections does not fail. For example, if paths 110 and 125 fail, the data traffic will be routed through paths 105 and 140 to access storage device 150. Special software must be running on the server to detect the failures and route the data through the working paths. The software is costly and requires valuable memory and CPU processing time from the server to manage the fail-over process.

SUMMARY OF THE INVENTION

The present invention is a system and method of achieving High Availability on fibrechannel data paths between an appliance's fibrechannel switch and its storage device by employing a technique called "port spoofing." This system and method do not require any proprietary software to be executing on the file/application appliance other than the software normally required on an appliance, which includes the operating system software, the applications, and the vendor-supplied driver to manage its fibrechannel host adapter(s).

The invention includes a system for appliance back-up, in which a primary appliance is coupled to a network, whereby the primary appliance receives requests or commands and sends a status message over the network to a standby appliance, which indicates that the primary appliance is operational. If the standby appliance does not receive the status message or the status message is invalid, the standby appliance writes a shutdown message to a storage device, which is also coupled to the network. The primary appliance then reads the shutdown message stored in the storage device and disables itself from processing requests or commands. Preferably, when the primary appliance completes these tasks, it disables communication connections and writes a shutdown completion message to the storage device. The standby appliance reads the shutdown completion message from the storage device and initiates a start-up procedure, which includes causing the address of the standby appliance to be identical to the primary appliance address and processing the requests or commands in place of the primary appliance. The primary appliance can include a fibrechannel adapter having associated therewith the primary appliance address, and the standby appliance can have a fibrechannel adapter having associated therewith the standby appliance address. The standby appliance can include a standby application, which is identical to a primary application in the primary appliance, for processing the requests or commands.

The invention also includes a method for appliance backup, which includes sending a status message from a primary appliance to a standby appliance indicating that the primary appliance is operational. If the standby appliance does not receive the status message or the status message is invalid, a shutdown message is written to a storage device. The primary appliance reads the shutdown message stored in the storage device and is disabled from processing requests or commands. The disabling of the primary appliance can include completing tasks, disabling communication connections, and writing a shutdown completion message to the storage device. The standby appliance reads the shutdown completion message from the storage device and initiates a start-up procedure so that a standby application, included in the standby appliance, can process the requests or commands. A standby appliance address is changed to the primary appliance address and the standby appliance processes the requests or commands.

Another method for appliance back-up is disclosed which includes monitoring a primary appliance for an indication of a failure, the primary appliance having a primary appliance address. If the failure occurs, a message is written to a storage device and, in response, the primary appliance is disabled from processing requests or commands. The failure can be the primary appliance not sending the status message to a standby appliance. The standby appliance has a standby appliance address, which is changed to the primary appliance address so the standby appliance can processes the requests or commands. The standby appliance address and the primary appliance address are world wide port names. The monitoring can include sending a status message to the standby appliance indicating that the primary appliance is operational, or sending a status request message to the primary appliance and receiving an update status message from the primary appliance. The failure message is written if the standby appliance does not receive the status message or if the status message is invalid. Alternatively, the message is written if the standby appliance does not receive the update status message or the update status message is invalid. The disabling can include completing tasks, disabling communication connections, writing a shutdown completion message to the storage device (by the primary appliance), reading the shutdown completion message from the storage device (by the standby appliance), and initiating a start-up procedure. The standby appliance can include a standby application, which is identical to a primary application in the primary appliance, for processing the requests or commands.

One of the primary advantages of the present invention is that additional software is not required to be running on the file/application server. Many system administrators prefer to only install the software that is necessary to run their file/application servers. Many other solutions require special software or drivers to run on the server in order to manage the fail-over procedure.

BRIEF DESCRIPTION OF THE DRAWINGS

These and other features and advantages of the invention will be apparent to those skilled in the art from the following detailed description of preferred embodiments, taken together with the accompanying drawings, in which.

DETAILED DESCRIPTION OF THE PREFERRED EMBODIMENTS

Figure 1:
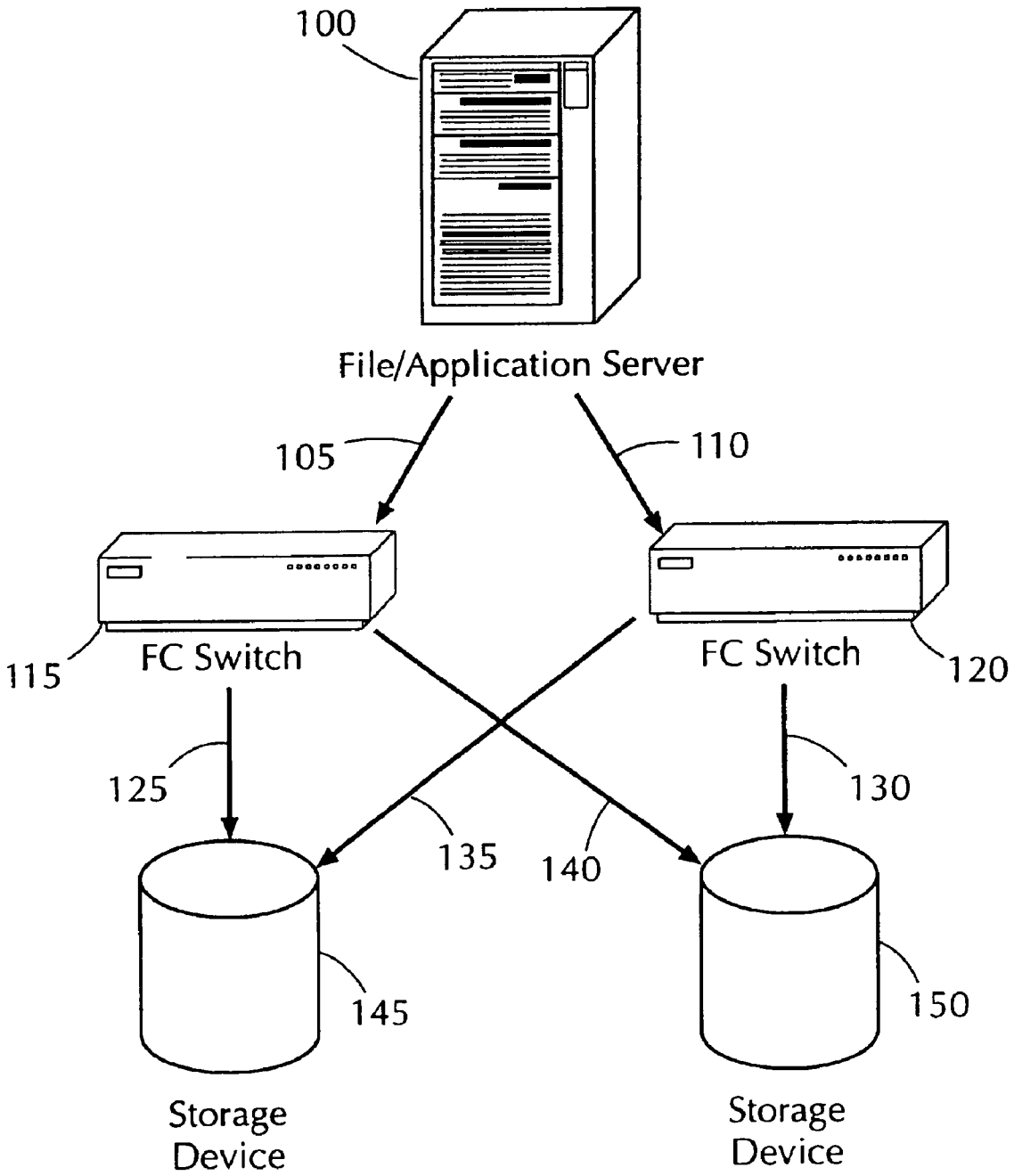
FIG. 1 (Prior art)
FIG. 1 is a block diagram of a prior art fibrechannel High Availability network configuration.

The present invention is based on a software platform that creates a storage area network ("SAN") for file and application servers to access their data from a centralized location. A virtualized storage environment is created and file/application servers can access its data through a communication protocol such as Ethernet/IP, fibrechannel, or any other communication protocol that provides high-speed data transmissions. Fibrechannel is the protocol that will be discussed herein, although it is understood that the other previously mentioned communication protocols are also within the scope of the present invention.

As mentioned before, computers, storage devices and other devices contain a fibrechannel (FC) controller or host adapter in order to communicate via fibrechannel. In the present invention, FC hubs/switches are used to connect file/application servers to servers that manage the storage devices. Storage devices can be RAID (redundant array of independent disks) subsystems, JBODs Just a bunch of disks), or tape backup devices, for example. An FC switch allows a server with a fibrechannel host adapter to communicate with one or more fibrechannel devices. Without a hub or switch, only a point-to-point or direct connection can be created, allowing only one server to communicate with only one device. "Switch" thus refers to either a fibrechannel hub or switch.

Fibrechannel adapters are connected together by fiber or copper wire via their FC port(s). Each port is assigned a unique address called a WWPN or "world wide port name." The WWPN is a unique 64-bit identifier assigned by the hardware manufacturer and is used to establish the source and destination between which data will travel. Therefore, when an FC device communicates with another FC device, the initiating FC device, or "originator," must use the second FC device's WWPN to locate the device and establish the communication link.

Fibrechannel devices that are connected together by an FC switch communicate on a "fabric." If a hub is employed, then the communication link is called a "loop." On a fabric, devices receive the full bandwidth when they are communicating with each other, and on a loop the bandwidth is shared.

Although the manufacturers assign WWPN addresses, the addresses are not permanently fixed to the hardware. The addresses can be changed. Software can programmatically change the WWPN addresses on the fibrechannel hardware. The present invention employs this feature by changing the WWPN address on a standby FC adapter to the WWPN address used by the failed FC adapter.

The present invention employs storage management software that is capable of running within any kind of computing device that has at least one CPU and is running an operating system. Examples of such computing devices are an Intel®-based PC, a Sun® Microsystems Unix® server, an HP® Unix® server, an IBM® Unix® server or embedded systems (collectively referred to as "appliances"). The software performs the writing, reading, management and protection of data from its file/application servers and workstations, and is disclosed with more specificity in U.S. patent application Ser. No. 09/792,873, filed Feb. 23, 2001, the disclosure of which has already been expressly incorporated herein by reference. One of the protection features of the software is the ability to "fail over" to another appliance if a set of defined failures occurs. The failures are defined and discussed in the following paragraphs.

Figure 2:
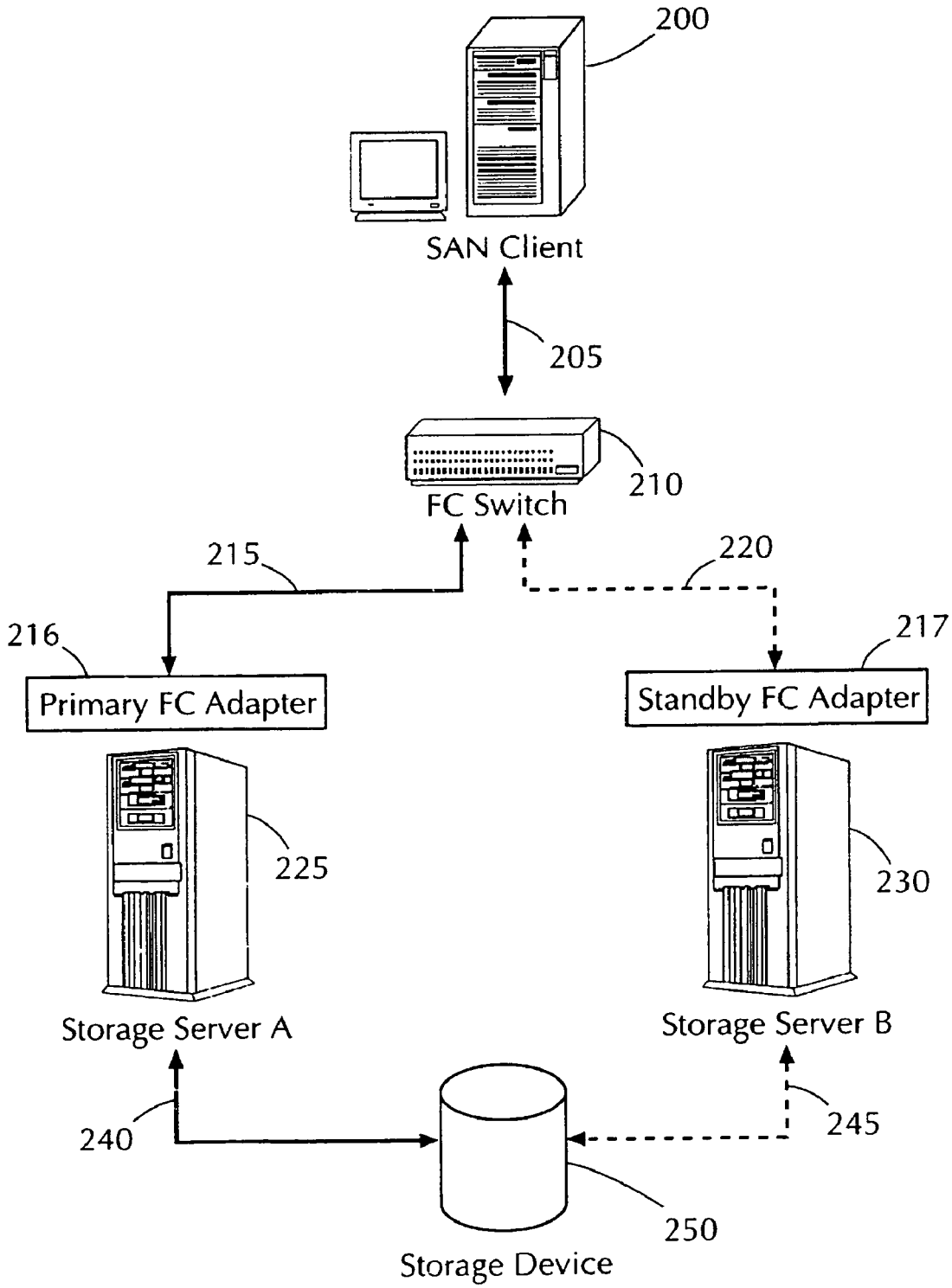
FIG. 2 is a block diagram of the network configuration of the present invention.

More specifically, the present invention creates a transparent secondary path for data to flow in the event that a primary data path to a storage device or storage server managing the primary path fails for any reason. The secondary path is a backup communication link to the same storage device. Each computer contains at least one FC host adapter connected to one FC switch. This operation is shown in FIG. 2, which includes SAN client 200, FC switch 210, storage server A 225, storage server B 230, and storage device 250. Attached to each storage server is an FC adapter—primary FC adapter 216 is attached to storage server A 225 and standby FC adapter 217 is attached to storage server B 230. (There is also an FC adapter, not shown, attached to SAN client 200.) The primary data path consists of paths 205, 215, and 240, and the transparent secondary data path consists of paths 220 and 245. The secondary path 220 is a backup communication link to storage device 250. If primary path 215 fails, storage server B 230 detects the failure and initiates its standby FC adapter 217 to begin "spoofing" primary FC adapter 216 by copying its identity and causing SAN client 200 to function with standby FC adapter 217 in place of primary FC adapter 216. Data then flow through backup FC connection 220, through standby FC adapter 217, into storage server B 230, and then to connection 245 to storage device 250.

Figure 3:
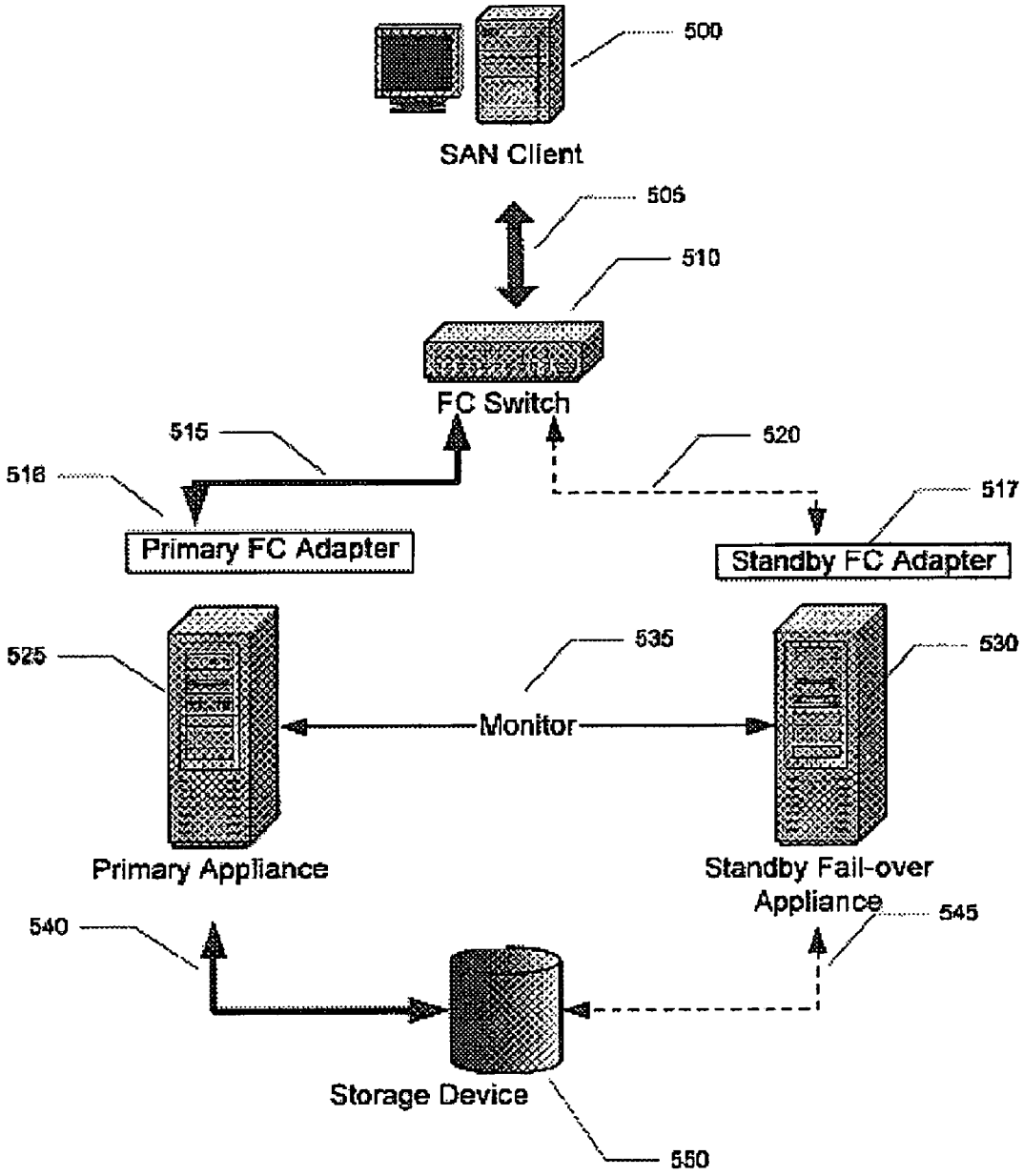
FIG. 3 is a detailed block diagram of FIG. 2.

FIG. 3 shows a more detailed view of FIG. 2. Two appliances, a primary appliance 525 and a standby appliance 530 are running the above-described software. The appliances can be computers, for example, personal computers, servers, or workstations. Standby appliance 530 is a fail-over appliance. The two appliances 525, 530 are connected to the same storage device 550 and to FC switch 510. The storage device 550 can be any kind of device that stores data important enough to require protection from failure such as a hard disk, a RAID system, a CDROM, or a tape backup device. SAN client 500, which is a file/application server or workstation, is configured with two separate data paths, a primary path made up of paths 515 and 540, and a standby path, made up of paths 520 and 545. Paths 515 and 520 always use a fibrechannel medium/protocol, but paths 540 and 545 may use fibrechannel, or may use a different medium/protocol such as SCSI, IDE (Integrated Drive Electronics) or any other storage medium/protocol. Although one SAN client is shown in the example of FIG. 3, in an actual production configuration, a primary appliance may manage the storage needs for multiple SAN clients. Data are actively transmitted bi-directionally over primary data paths 515, 540 between SAN client 500, primary appliance 525 and storage device 550 (as long as primary appliance 525 and its paths 515 and 540 remain in good working order). No data will be transmitted bidirectionally over standby paths 520, 545 between SAN client 500 and storage device 550. However, standby appliance 530 may or may not be data active (i.e., ready to receive or receiving data from the SAN client) depending on its configuration.

This standby appliance 530 can be implemented strictly as a fail-over appliance for one or more primary appliances. If its only function is to standby, then standby appliance 530 must wait for one of the primary appliances to fail so that it can become data active. If a standby appliance 530 is a fail-over appliance for more than one primary appliance 525, then it must contain one dedicated standby FC adapter 517 for each primary appliance 525, and it must have a dedicated connection to each storage device 550 that it might need to manage. Standby appliance 530 itself can also be a primary appliance to its own set of SAN clients and storage devices 550. The operations of being both a primary and standby appliance are multitasked.

Standby appliance 530 monitors the status or the "health" of its primary appliance 525 through a communications link called the health monitor link 535. Messages called "fail-over heartbeats" are sent from standby appliance 530 to primary appliance 525, and if the messages are properly acknowledged the status of primary appliance 525 is acceptable. A "heartbeat" system is disclosed with more specificity in U.S. patent application Ser. No. 09/925,976, filed Aug. 9, 2001, entitled "System And Method For Computer Storage Security," the disclosure of which has already been expressly incorporated herein by reference. If the heartbeat is not properly acknowledged or not acknowledged at all, then standby appliance 530 will begin the procedure for taking over the tasks of primary appliance 525. The heartbeat can also be implemented such that the heartbeat is sent from primary appliance 525 to standby appliance 530; this simply is a choice based on the software's architecture and ease of implementation. If a standby appliance 530 is a fail-over appliance for multiple primaries, the communications link can be configured to be shared among all primary appliances 525 or one dedicated communications link can be connected from each primary appliance 525 to standby appliance 530. The communications link can be any type of medium or protocol such as, for example, an Ethernet IP connection, a fibrechannel connection or a serial connection. It is also possible that the health monitor can also function from standby FC adapter 517 along standby path 520 to monitor the status of the primary appliance.

The health monitor link 535 performs several tasks:

1. It is used to monitor the status of the primary appliance. The standby appliance sends a request for the primary appliance's status. This is the heartbeat. The primary appliance sends the status data to the standby appliance, and the data are then analyzed. If a problem is discovered, the standby appliance will instruct the primary appliance to shut down.
2. Health monitor link 535 is used to initially transfer all the required information from the primary appliance to the standby appliance that is needed to emulate the primary appliance in the event that a fail-over event takes place when the standby appliance was assigned as the fail-over appliance for the primary appliance. This information includes the operating parameters and data for the primary appliance and is static. "Static" means that the parameters do not change during the operation of the primary appliance. If the parameters are changed due to new requirements and needs by the user, the primary appliance will transfer the new information to the standby appliance. An alternative implementation is that the standby appliance is notified of the change and a request is sent from the standby appliance to the primary appliance to retrieve the new set of parameters. Currently the first method is used (request from primary appliance to standby appliance) but future implementations due to evolution of the fail-over feature may require the latter method.
3. Health monitor link 535 is used to transfer any information from the primary appliance to the standby appliance at the time of fail-over if the primary appliance continues to run. This information is used to help smooth the standby appliance's fail-over process. This information is dynamic and is not required by the standby appliance—the information is merely helpful. The information is dynamic because its content is based on its current operating state. The information is not required because if the primary appliance failure were due to a system crash, the standby appliance would not be able to receive this information.
4. Health monitor link 535 is used by the primary appliance to inform the standby appliance to begin taking over if the primary appliance discovers a problem where it becomes necessary for the primary appliance itself to initiate the fail-over process.
5. Health monitor link 535 is used by the standby appliance to inform the primary appliance to shut itself down so that the standby appliance can take over the primary appliance's tasks if it detects over its health monitor link an imminent failure of the primary appliance.
6. Health monitor link 535 is used by the standby appliance to inform the primary appliance to resume its FC activities when the primary appliance's failure has been fixed.

The standby appliance does this by maintaining its connection with the primary appliance even though the primary appliance is no longer active to receive or send commands and data. The primary appliance continues to send status data to the standby appliance. When the problem affecting the primary appliance has been repaired, the standby appliance will be informed via the status data, whereby the standby appliance will begin de-activating itself from receiving additional commands and data from the SAN client and will instruct the primary appliance to begin its start-up procedure to resume receiving commands and data from the SAN client once again.

Standby appliance 530 also takes over its primary appliance's tasks if health monitor link 535 is broken or the heartbeat is not acknowledged. Health monitor link 535 may be broken due to a cut cable or "accidental" removal. The heartbeat may not be acknowledged because primary appliance 525 loses power, crashes, or incurs another similar event. Although a broken link 535 does not affect the ability of primary appliance 525 to perform its tasks, primary appliance 525 will be regarded as a failed appliance nonetheless, and standby appliance 530 will take steps to begin to take over the tasks from primary appliance 525. Since standby appliance cannot communicate to primary appliance 525 to shut itself down, a backup method is used to pass on the shutdown signal.

Figure 4:
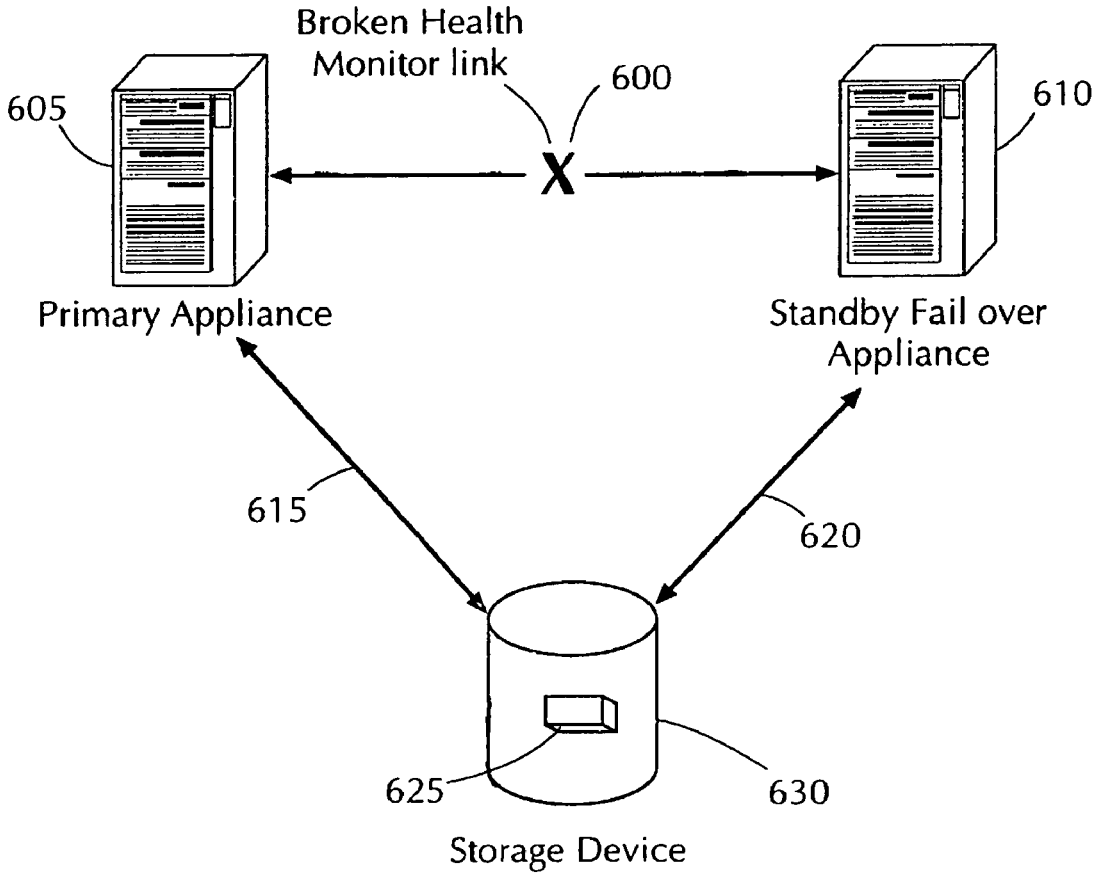
FIG. 4 is a block diagram showing a failed health monitor connection and the method used to send a shutdown signal.

FIG. 4 illustrates a failed health monitor connection 600 and the method used to send a shutdown signal. Since primary appliance 605 and standby appliance 610 are connected to the same storage device 630, storage device 630 will become the medium used to pass the shutdown signal to primary appliance 605. A common file or a disk sector (or sectors) 625 is reserved on the storage device 630. Primary appliance 605 monitors the common file or disk sector 625 at regular, predefined intervals for instructions from standby appliance 610. If standby appliance 610 detects no acknowledgement from its heartbeats or there is a broken health monitor link, the standby appliance writes into common file 625 an instruction for primary appliance 605 to begin its shutdown procedures, which include completing outstanding tasks to its application/file servers and/or workstation and disconnecting itself from the fibrechannel communication network. If primary appliance 605 is alive, which means that the health monitor link is corrupted, the primary appliance reads the shutdown signal from the common file 625 and writes an acknowledgement into the common file 625 that it has received the shutdown signal and is beginning its shutdown procedure. Standby appliance 610 then waits a pre-determined amount of time for a message to come through the common file 625 from primary appliance 605 that the latter has completed its shutdown procedure. Standby appliance 610 monitors the common file 625 for the completion message during this time interval, and begins its start-up procedures as soon as the completion message is given. When the shutdown procedure is completed by primary appliance 605, primary appliance then writes a shutdown completion message to common file 625, and standby appliance 610 begins its procedure to become active and take over the tasks of its failed primary appliance 605. If standby appliance 610 does not receive a shutdown completion message from primary appliance 605 within a predetermined time interval, standby appliance 610 assumes that primary appliance 605 has become totally inoperative and initiates its procedures to become active to take over the tasks of the failed primary appliance 605. Since common file 625 is used as a backup communication link between the appliances, it is also used to communicate any dynamic information from the primary appliance to the standby appliance that may be helpful to the fail-over process. This information can be historical and/or state information, which can be used during start-up procedures by either appliance. For example, if the primary appliance is turned off followed by the standby appliance being turned off, the standby appliance writes a message to the storage device indicating that it is no longer operating in place of the primary server. If the primary appliance resumes operation before the standby appliance, the primary appliance knows from reading the message that it is to resume processing commands and requests. As stated earlier, this information is not is required for the fail-over process—it simply makes the process easier.

If primary appliance 605 initially becomes inoperative because of loss of power, system crash, or some other catastrophic event, standby appliance 610 writes its shutdown message to the common file 625 with the assumption that primary appliance 605 may still be active. Standby appliance 610 functions in this manner because it cannot be assumed that primary appliance 605 is totally inoperative. A predetermined time interval is given by standby appliance 610 for primary appliance 605 to respond to the shutdown message, and if the shutdown message is not acknowledged standby appliance 610 begins its procedures to become active to take over the tasks of the failed primary appliance 605. Standby appliance 610 monitors the common file 625 for the shutdown acknowledgement message, and as soon as this message is received standby appliance 610 waits for the shutdown completion message.

Figure 5:
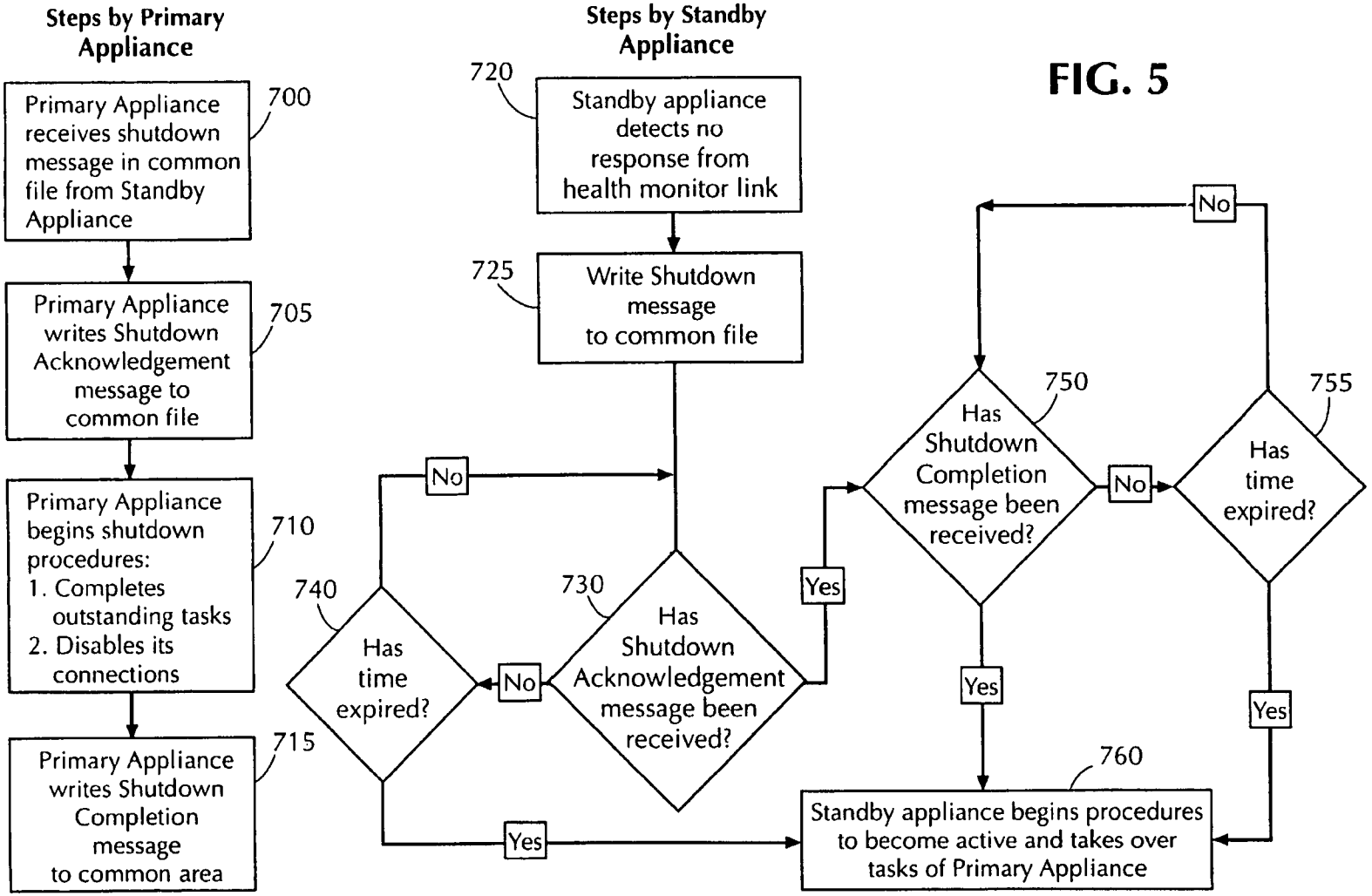
FIG. 5 is a flowchart showing the actions of the primary appliance and the standby appliance when the health monitor link or primary appliance is non-functional.

FIG. 5 is a flowchart which describes the actions taken by primary appliance 605 and standby appliance 610 when the health monitor link or primary appliance is non-functional. Blocks 700 through 715 illustrate the steps undertaken by primary appliance 605. At block 700, primary appliance 605 receives the shutdown message in common file 625 from standby appliance 610. Primary appliance 605 writes a shutdown acknowledgment message to common file 625 at block 705. At block 710, primary appliance 605 begins its shutdown procedure by completing outstanding tasks and disabling its connections. Finally, at block 715, primary appliance 605 writes its shutdown completion message to common file 625.

Blocks 720 through 760 detail the steps employed by standby appliance 610. At block 720, standby appliance 610 detects the lack of a response from the health monitor link. In step 725, standby appliance 610 next writes the shutdown message to common file 625. The program proceeds to blocks 730 and 740 to wait for a shutdown acknowledgment message from primary appliance 605. Block 730, which queries whether the shutdown acknowledgment message has been received from primary appliance 605. If the answer is "NO," the program proceeds to decision block 740, which queries whether the predetermined time period has expired. If the answer at decision block 740 is "NO," the program loops back to block 730. If the answer at decision block 740 is "YES," the program proceeds to block 760 where standby appliance 610 begins procedures to become active and to take over the tasks of primary appliance 605. Returning to decision block 730, if the answer to the query is "YES," the program proceeds to blocks 750 and 755 where standby appliance 610 waits for the shutdown completion message from primary appliance 605. In decision block 750, the program queries whether the shutdown completion message has been received from primary appliance 605. If the answer is "NO," the program proceeds to decision block 755, which queries whether the predetermined time period has expired. If the answer at decision block 755 is "NO," the program loops back to block 750. If the answer at decision block 755 is "YES," the program proceeds to block 760 where standby appliance 610 begins procedures to become active and to take over the tasks of primary appliance 605. Returning to decision block 750, if the answer to the query is "YES," the program again proceeds to decision block 760, as discussed immediately above.

After the shutdown completion message is received or after the time has expired waiting for the shutdown acknowledgement or completion messages, the standby appliance begins its procedures to become active. From FIG. 3, standby appliance 530 reprograms its standby FC adapter 517 with the WWPN address from primary FC adapter 516. Standby FC adapter 517 was given a temporary WWPN address in order for it to be connected to the fibrechannel fabric. Standby appliance 530 knows the WWPN address of the primary appliance because when standby appliance 530 was initially assigned to be the fail-over appliance for primary appliance 525, it communicated with primary appliance 525 to transfer all the necessary information it needed to perform the emulation. This information included the WWPN address of primary FC adapter 516.

Figure 6:
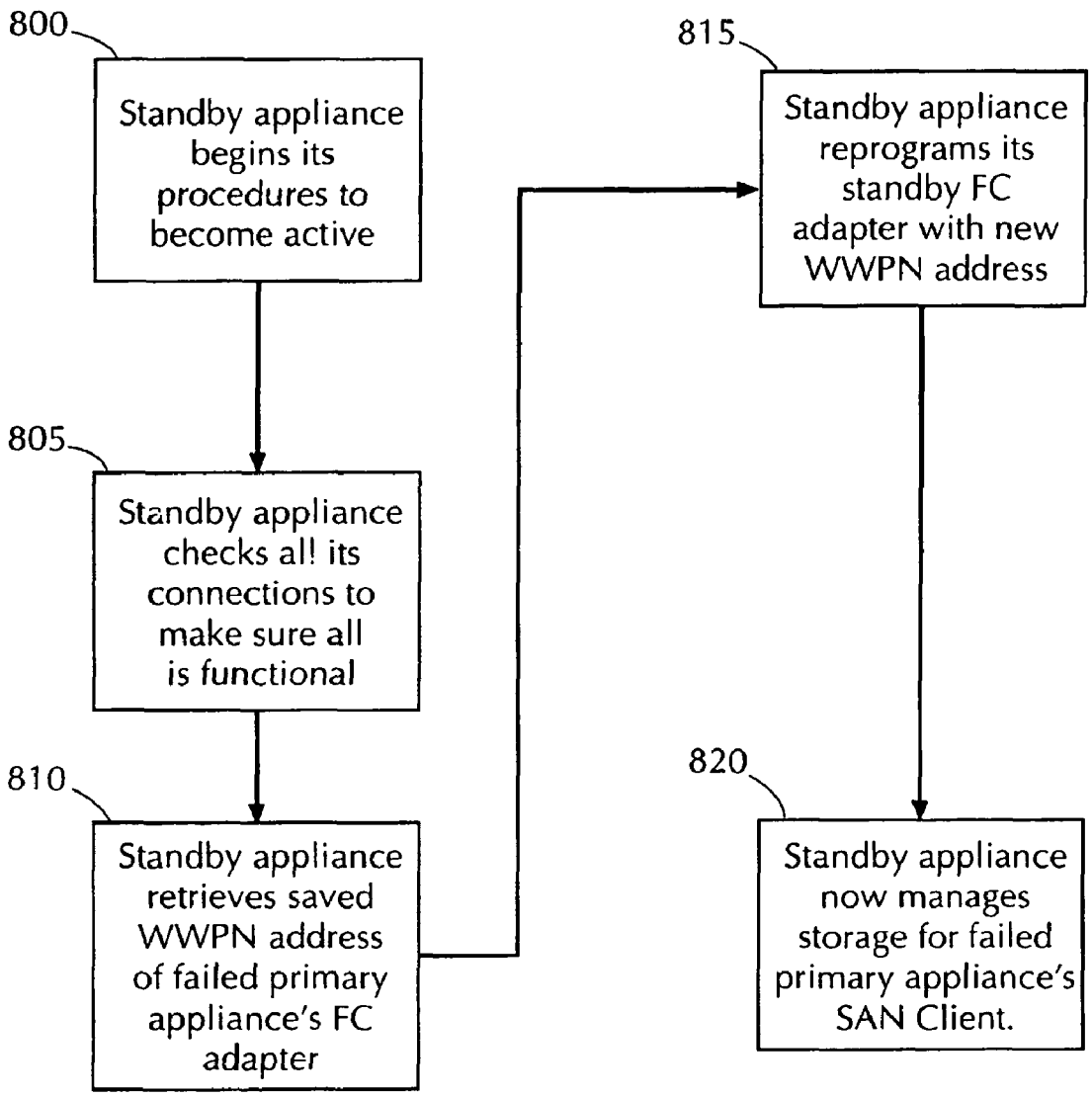
FIG. 6 is a flowchart showing the actions of the standby appliance to become active.

A flowchart in FIG. 6 shows the steps taken by standby appliance 530. At block 800, standby appliance 610 initiates its activation procedures. Standby appliance 610 checks its connection at block 805 to ensure functionality. At block 810, standby appliance 610 retrieves the saved WWPN address of the FC adapter of failed primary appliance 605. Standby appliance 610 reprograms its standby FC adapter with the new WWPN address at block 815. Finally, at block 820 standby appliance 610 is functionally able to manage storage for the SAN client of failed primary appliance 605, in a manner transparent to the SAN client.

Once the WWPN address is programmed into standby FC adapter 517, SAN client 500 will not be aware of the change in appliances. Standby appliance 530 will now receive all the data traffic that was bound for failed primary appliance 525. When a standby appliance is a fail-over appliance for one or more than one primary appliances, a table is kept to store and keep track of the information needed to emulate the primary appliances, which includes the WWPN addresses.

Figure 7:
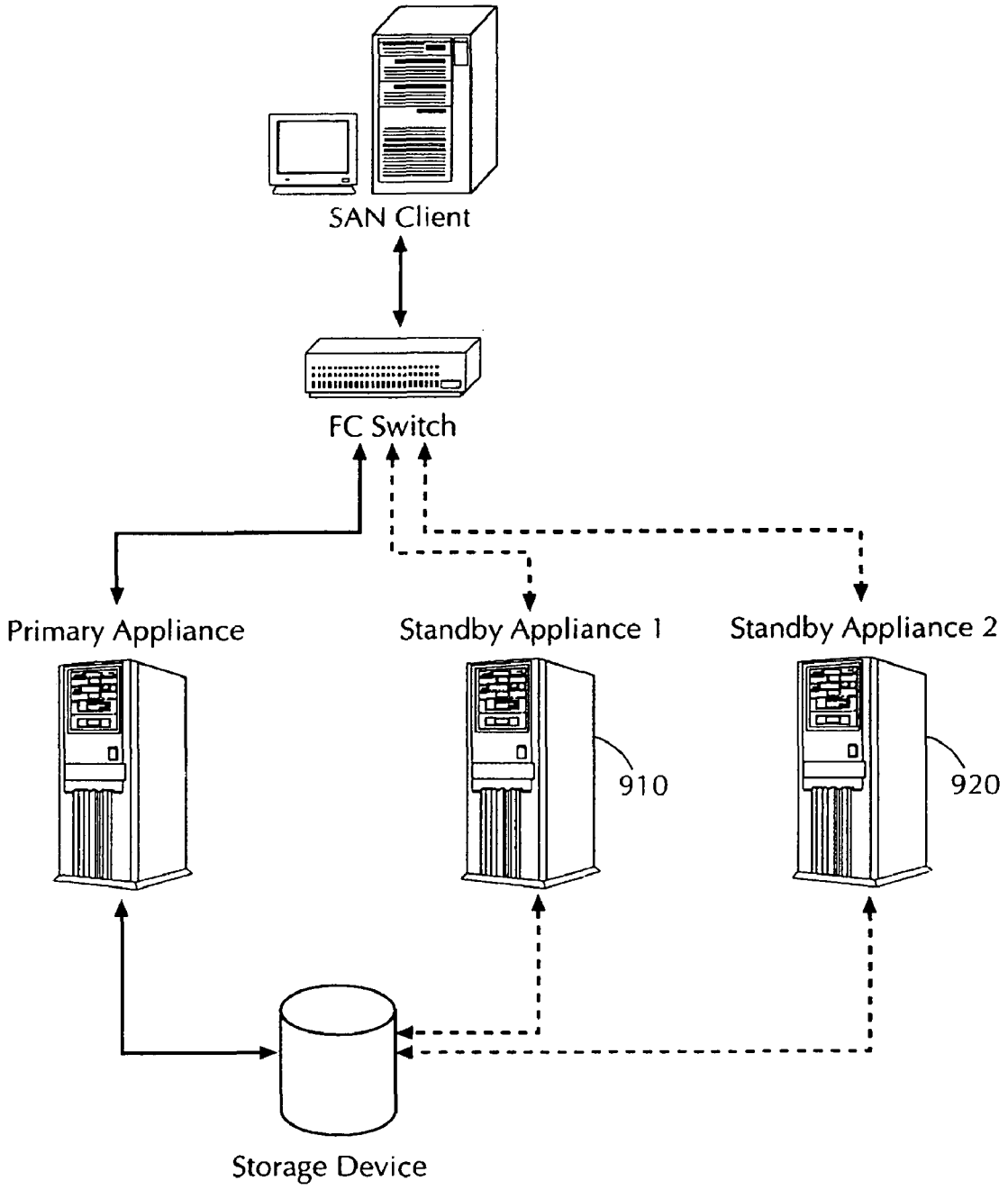
FIG. 7 is a block diagram showing more than one standby appliance.

The technology of the present invention is not limited to one standby appliance that can act as a fail-over to a set of primary appliances. As illustrated in FIG. 7, the present invention also encompasses having a standby fail-over appliance 910 acting as a fail-over appliance to another standby fail-over appliance 920. In this way, such multiple backup systems protect businesses' computer and storage systems from failing.

It should be understood by those skilled in the art that the present description is provided only by way of illustrative example and should in no manner be construed to limit the invention as described herein. Numerous modifications and alternate embodiments of the invention will occur to those skilled in the art. Accordingly, it is intended that the invention be limited only in terms of the following claims.

What is claimed is:

1. A system for appliance back-up comprising:

a network;

a storage device coupled to the network; and a primary appliance and a standby appliance coupled to the network, the primary appliance receiving requests or commands and sending a status message via the network to the standby appliance indicating that the primary appliance is operational, wherein if the standby appliance does not receive the status message or the status message is invalid:

the standby appliance writes a shutdown message to [a] *the* storage device, the primary appliance reads the shutdown message stored in the storage device and disables itself from processing requests or commands, and the standby appliance causes a standby appliance address to be identical to a primary appliance address and processes the requests or commands.

2. The system of claim 1, wherein the primary appliance completes tasks and disables communication connections.

3. The system of claim 2, wherein the primary appliance writes a shutdown completion message to the storage device.

4. The system of claim 3, wherein the standby appliance reads the shutdown completion message from the storage device and initiates a start-up procedure.

5. The system of claim 1, wherein the primary appliance includes a primary application and the standby appliance includes a standby application, the standby application being identical to the primary application.

6. The system of claim 1, wherein the primary appliance includes a first fibrechannel adapter having associated therewith the primary appliance address and the standby appliance includes a second fibrechannel adapter having associated therewith the standby appliance address.

7. A method for appliance back-up comprising:

sending a status message from a primary appliance to a standby appliance indicating that the primary appliance is operational;

if the standby appliance does not receive the status message or the status message is invalid:

writing a shutdown message to a storage device;

reading the shutdown message stored in the storage device;

disabling the primary appliance from processing requests or commands;

causing a standby appliance address to be identical to a primary appliance address; and causing the standby appliance to process the requests or commands.

8. The method of claim 7, wherein the disabling further comprises completing tasks and disabling communication connections.

9. The method of claim 7, wherein the disabling further comprises writing a shutdown completion message to the storage device.

10. The method of claim 9, further comprising:

reading the shutdown completion message from the storage device; and initiating a start-up procedure.

11. The method of claim 7, wherein the primary appliance includes a primary application and the standby appliance includes a standby application, identical to the primary application, for processing the requests or commands.

12. A method for appliance back-up comprising:

monitoring a primary appliance for an indication of a failure, the primary appliance having a primary appliance address, wherein if the failure occurs:

writing a message to a storage device;

in response to the message, disabling the primary appliance from processing requests or commands;

causing a standby appliance address of a standby appliance to be identical to the primary appliance address; and processing the requests or commands.

13. The method of claim 12, wherein the monitoring further comprises sending a status message to the standby appliance indicating that the primary appliance is operational.

14. The method of claim 12, wherein the monitoring further comprises sending a status request message to the primary appliance and receiving an update status message from the primary appliance.

15. The method of claim 13, wherein the failure is the status message is not sent to the standby appliance.

16. The method of claim 13, wherein the message is written if the standby appliance does not receive the status message or the status message is invalid.

17. The method of claim 16 wherein the disabling further comprises completing tasks and disabling communication connections.

18. The method of claim 17, wherein the disabling further comprises writing a shutdown completion message to the storage device.

19. The method of claim 18, further comprising:

reading the shutdown completion message from the storage device; and initiating a start-up procedure.

20. The method of claim 14, wherein the message is written if the standby appliance does not receive the update status message or the update status message is invalid.

21. The method of claim 20, wherein the disabling further comprises completing tasks and disabling communication connections.

22. The method of claim 21, wherein the disabling further comprises writing a shutdown completion message to the storage device.

23. The method of claim 12, wherein the standby appliance address and the primary appliance address are world wide port names.

24. The method of claim 12, wherein the primary appliance includes a primary application and the standby appliance includes a standby application, identical to the primary application, for processing the requests or commands.

*25. The system of claim 1, wherein:*

*the standby appliance monitors the status of the primary appliance via a communications link; and*

*the standby appliance writes the shutdown message to the storage device if the communications link is broken.*

*26. The method of claim 7, comprising writing the shutdown message to the storage device if a communications link between the standby appliance and the primary appliance is broken.*

*27. A communications system, comprising:*

*at least one storage device;*

*a first appliance configured to receive requests or commands for communicating with one or more of the at least one storage devices via a first communications link, the first appliance having a first appliance address; and*

*a second appliance configured to:*

*transmit, at selected times, messages to the first appliance via a second communications link different from the first communications link;*

*wherein:*

*the first appliance is further configured to:*

*communicate with one or more of the at least one storage devices in response to a received request or command; and*

*in response to each message received from the second appliance, provide an indication to the second appliance of a status of the first appliance via the second communications link; and*

*the second appliance is further configured to:*

*monitor the status of the first appliance based, at least in part, on the indications received from the first appliance;*

*determine whether a proper indication is received in response to each message;*

*assume an emulation address comprising the first appliance address in order to receive the requests or commands addressed to the first appliance, based, at least in part, on a failure to receive a proper indication;*

*process the requests or commands addressed to the first appliance, after assuming the emulation address;*

*continue to monitor the status of the first appliance, after assuming the emulation address;*

*if failure to receive a proper indication from the first appliance is due to a problem relating to the first appliance, determine that the problem has been resolved; and*

*transmit to the first appliance via the second communications link information directing the first appliance to resume receiving requests and commands directed to the first appliance address, when the second appliance determines that the problem has been resolved; and*

*the first appliance is further configured to resume receiving requests and commands directed to the first appliance address, in response to the information.*

*28. The system of claim 27, wherein the indication comprises a message.*

*29. The system of claim 27, wherein the indication comprises failure to receive the message.*

*30. The system of claim 27, wherein the status relates to whether the first appliance is operational.*

*31. The system of claim 27, wherein:*

*the first appliance and the second appliance communicate via a link.*

*32. The system of claim 31, wherein:*

*the second appliance is configured to send a heartbeat to the first appliance, via the link; and*

*the first appliance is configured to send the indication in response to the heartbeat, via the link.*

*33. The system of claim 27, wherein the second appliance is further configured to cause the first appliance to disable itself, based at least in part, on the indication.*

*34. The system of claim 33, wherein:*

*the second appliance is configured to cause the first appliance to disable itself, by writing a message to one of the at least one storage devices.*

*35. The system of claim 34, wherein:*

*the second appliance is configured to write the message to the storage device if a communications link between the second appliance and the first appliance fails.*

*36. The system of claim 33, wherein:*

*the second appliance is configured to cause the first appliance to disable itself by informing the first appliance over the link.*

*37. The system of claim 33, wherein:*

*the first appliance is configured to continue to provide an indication to the second appliance of the status of the first appliance after being disabled; and*

*the second appliance is further configured to:*

*instruct the first appliance to begin a start-up procedure, based, at least in part, on the indication, after disabling of the first appliance.*

*38. The system of claim 27, wherein:*

*the first and second appliances are coupled to a network.*

*39. The system of claim 27, wherein the second appliance stores information relating to the first address, before the second appliance determines that the first appliance is not operational.*

*40. The system of claim 27, wherein the first and second appliance addresses comprise, at least in part, a worldwide port name.*

*41. The system of claim 27, wherein the emulation address and the first appliance address are the same.*

*42. The system of claim 27, wherein:*

*the first appliance comprises a first fibrechannel adapter having associated therewith the first appliance address; and*

*the second appliance comprises a second fibrechannel adapter having associated therewith the second appliance address.*

*43. The communications system of claim 27, wherein the first appliance is further configured to:*

*continue to provide indications to the second appliance of the status of the first appliance; and*

*the second appliance is configured to determine that the problem has been resolved based, at least in part, on the indications.*

*44. A communications system, comprising:*

*a network;*

*at least one storage device;*

*a first appliance coupled to the network via a first communications link, to receive requests or commands for communicating with one or more of the at least one storage device, the first appliance having a first appliance address; and*

*a second appliance coupled to the network;*

*wherein the first appliance is configured to:*

*communicate with one or more of the at least one storage devices, based, at least in part, on the requests or commands; and*

*provide an indication to the second appliance indicating a status of the first appliance; and*

*the second appliance is configured to:*

*determine a status of the first appliance, based, at least in part, on the indication;*

*assume an emulation address comprising the first appliance address to receive the requests or commands directed to the first appliance, based at least in part, on the indication;*

*process the requests or commands addressed to the first appliance after assuming the emulation address;*

*cause the first appliance to disconnect itself from the network based at least in part, on the second status;*

*determine a second status of the first appliance after the first appliance is disconnected from the network; and*

*instruct the first appliance via a second communications link different from the first communications link, to connect itself to the network based, at least in part, on the second status.*

*45. The system of claim 44, wherein:*

*the first appliance is configured to continue to provide an indication to the second appliance of the second status of the first appliance; and*

*the second appliance is further configured to:*

*instruct the first appliance to begin a start-up procedure to resume reception and processing of requests or commands, based, at least in part, on the indication.*

*46. The system of claim 44, further comprising:*

*a communications link between the first appliance and the second appliance.*

*47. The system of claim 46, wherein:*

*the second appliance is configured to send a heartbeat to the first appliance, via the link; and*

*the first appliance is configured to send the indication in response to the heartbeat, via the link.*

*48. The system of claim 46, wherein the second appliance is configured to write a message to the storage device to cause the first appliance to disable itself, if the link is broken.*

*49. The communications system of claim 44, wherein:*

*the first appliance is configured to provide the indication to the second appliance via the second communications link.*

*50. The communications system of claim 49, wherein:*

*the second appliance causes the first appliance to disconnect itself from the network by instructing the first appliance via the second communications link.*

*51. The communications system of claim 44, wherein:*

*the second appliance causes the first appliance to disconnect itself from the network by instructing the first appliance via the second communications link.*

*52. A system comprising*

*a first device configured to process requests or commands received from a network, via a first communications link, the first device having a first address; and*

*a second device configured to:*

*determine a status of the first device;*

*assume an emulation address including, at least in part, the first address, based, at least in part, on the determination;*

*cause the first device to disconnect itself from the network based, at least in part, on the determination;*

*determine a second status of the first device after the first device disconnects from the network; and*

*instruct the first device via a second communications link different from the first communications link, to connect itself to the network based, at least in part, on the second status.*

*53. The system of claim 52, wherein the second device is further figured to:*

*process requests or commands addressed to the first device, after assuming the emulation address.*

*54. A method of operating a communications system comprising a first appliance to process requests or commands received from a network via a first communications link and a second appliance, the method comprising:*

*determining by a second appliance a status of a first appliance;*

*assuming by the second appliance an address associated with the first appliance, based, at least in part, on the status;*

*processing requests or commands addressed to the first appliance, by the second appliance, after assuming the address;*

*causing the first appliance to disconnect itself from the network based, at least in part, on the determination, by the second appliance;*

*determining by the second appliance a second status of the appliance after the first appliance is disconnected from the network; and*

*instructing the first appliance via a second communications link different from the first communications link, to begin a start-up procedure to resume reception and processing of requests or commands based, at least in part, on the second status, by the second appliance.*

*55. The method of claim 54, comprising:*

*assuming by the second appliance a same address as the first appliance.*

*56. The method of claim 54, comprising:*

*determining the status of the first appliance based, at least in part, on an indication from the first appliance.*

*57. The method of claim 54, wherein the indication comprises a message.*

*58. The method of claim 54, wherein the indication comprises failure to receive a message.*

*59. The method of claim 54, wherein:*

*the first appliance and the second appliance communicate via a link.*

*60. The method of claim 59, further comprising:*

*sending a heartbeat between the first appliance and the second appliance, via the link;*

*sending an acknowledgement of the heartbeat between the first appliance and the second appliance; and*

*disabling the first appliance if either or both of the heartbeat or the acknowledgement are not received by the second appliance.*

*61. The method of claim 59, further comprising:*

*detecting a break in the link; and*

*writing a message to a storage device to disable the first appliance, if a break in the link is detected.*

*62. The method of claim 54, further comprising:*

*receiving by the second appliance a request or command addressed to the first appliance after the second appliance assumes the address; and*

*processing, by the second appliance, the request or command.*

*63. The method system of claim 54, further comprising:*

*disabling the first appliance, based, at least in part on the indication.*

*64. The method of claim 63, further comprising:*

*continuing to receive an indication of the status of the first appliance by the second appliance, after causing the first appliance to disconnect itself from the network.*

*65. A communications system, comprising:*

*at least one storage device;*

*a first appliance to receive requests or commands for communicating with one or more of the at least one storage devices, the first appliance having a first appliance address; and*

*a second appliance;*

*wherein the first appliance is configured to:*

*communicate with one or more of the at least one storage devices in response to a received request or command; and*

*provide an indication to the second appliance of a status of the first appliance; and*

*the second appliance is configured to:*

*determine a status of the first appliance based, at least in part, on the indication;*

*assume an emulation address comprising the first appliance address in order to receive the requests or commands addressed to the first appliance, based, at least in part, on the indication;*

*process the requests or commands addressed to the first appliance, after assuming the emulation address; and*

*write a message to one of the at least one storage devices to cause the first appliance to disable itself, based at least in part, on the indication.*

*66. The system of claim 65, wherein:*

*the second appliance is configured to write the message to the storage device if a communications link between the second appliance and the first appliance fails.*

*67. The communications system of claim 65, wherein:*

*the network comprises a fibrechannel network.*

*68. The communications system of claim 67, wherein:*

*the first appliance includes a first fibrechannel adaptor having associated therewith the first appliance address; and*

*the second appliance includes a second fibrechannel adaptor having associated therewith the emulation address.*

*69. The communications system of claim 68, wherein:*

*the first appliance address comprises a first world wide port name ("WWPN").*

*70. A communications system, comprising:*

*a network;*

*at least one storage device;*

*a first appliance coupled to the network, to receive requests or commands for communicating with one or more of the at least one storage devices, the first appliance having a first appliance address;*

*a second appliance coupled to the network; and*

*a communications link between the first appliance and the second appliance*

*wherein the first appliance is configured to:*

*communicate with one or more of the at least one storage devices, based, at least in part, on the requests or commands; and*

*provide an indication to the second appliance indicating a status of the first appliance; and*

*the second appliance is configured to:*

*determine a status of the first appliance, based, at least in part, on the indication;*

*assume an emulation address comprising the first appliance address to receive the requests or commands directed to the first appliance, based at least in part, on the indication;*

*process the requests or commands addressed to the first appliance after assuming the emulation address; and*

*writing a message to the storage device to cause the first appliance to disable itself from processing requests or commands, if the link is broken.*

*71. The communications system of claim 70, wherein:*

*the network comprises a fibrechannel network.*

*72. The communications system of claim 71, wherein:*

*the first appliance includes a first fibrechannel adaptor having associated therewith the first appliance address; and*

*the second appliance includes a second fibrechannel adaptor having associated therewith the emulation address.*

*73. The communications system of claim 72, wherein:*

*the first appliance address comprises a first world wide port name ("WWPN").*

*74. A communications system, comprising:*

*at least one storage device;*

*a first appliance having a first appliance address, the first appliance being configured to:*

*receive requests or commands for communicating with one or more of the at least one storage devices via a first communications link; and*

*a second appliance configured to:*

*transmit, at selected times, messages to the first appliance via a second communications link different from the first communications link; and*

*wherein:*

*the first appliance is further configured to:*

*communicate with one or more of the at least one storage devices in response to a received request or command;*

*in response to each message received from the second appliance, provide an indication to the second*

*appliance of a status of the first appliance via the second communications link; and*

*inform the second appliance, via the second communications link, of a problem relating to an operation of the first appliance, if the first appliance detects a problem relating to the operation of the first appliance; and*

*the second appliance is further configured to:*

*assume an emulation address comprising the first appliance address in order to receive the requests or commands addressed to the first appliance, if informed of a problem relating to the operation of the first appliance;*

*process the requests or commands addressed to the first appliance, after assuming the emulation address; and*

*instruct the first appliance via the second communications link to begin a start-up procedure, if informed that the problem has been repaired.*

*75. The communications system of claim 74, wherein:*

*the first appliance is further configured to inform the second appliance that the problem has been repaired.*

*76. The communications system of claim 75, wherein:*

*the first appliance is further configured to inform the second appliance that the problem has been repaired, via the second communications link.*

*77. The communications system of claim 74, wherein the second appliance is further configured to de-activate itself from receiving requests or commands addressed to the first appliance, after instructing the first appliance to begin the start-up procedure.*

* * * * *